United States Patent [19]

Cole et al.

[11] 4,396,878
[45] Aug. 2, 1983

[54] BODY REFERENCED GIMBALLED SENSOR SYSTEM

[75] Inventors: Donald E. Cole, Covina; John M. Speicher, Upland, both of Calif.

[73] Assignee: General Dynamics, Pomona Division, Pomona, Calif.

[21] Appl. No.: 282,622

[22] Filed: Jul. 13, 1981

[51] Int. Cl.$^3$ .............................................. G05D 1/08
[52] U.S. Cl. .................................. 318/648; 318/586; 318/616; 318/176
[58] Field of Search ............... 318/648, 586, 587, 616, 318/617, 618; 244/176, 177

[56] References Cited

U.S. PATENT DOCUMENTS

| | | | |
|---|---|---|---|
| 3,875,488 | 4/1975 | Crocker | 318/648 |
| 4,188,570 | 2/1980 | Masters et al. | 318/648 X |
| 4,222,270 | 9/1980 | Allen | 318/648 X |
| 4,223,259 | 9/1980 | Ernsberger et al. | 318/648 |
| 4,240,301 | 12/1980 | Mason | 318/648 X |
| 4,264,852 | 4/1981 | Derossi | 318/648 |

Primary Examiner—B. Dobeck
Attorney, Agent, or Firm—Neil F. Martin; Michael H. Jester; Edward B. Johnson

[57] ABSTRACT

A system for proportionally navigating an airframe to a target wherein the airframe is maneuvered by an onboard flight control system including body rate gyros for detecting the movement of the airframe relative to a fixed reference. A target sensor is mounted for pivotal movement in the pitch and yaw planes on a gimbal assembly rigidly connected to the airframe body. Mechanisms, such as motor/tachometer/potentiometer assemblies, pivot the sensor in the pitch and yaw planes and provide signals representative of the angular rate of motion and angular position of the sensor. These signals, along with the sensor output, are utilized in a gimbal track loop for pivoting the sensor so that it tracks the target. The outputs of the body rate gyros are utilized to remove or decouple the airframe body motion from the gimbal track loop signal. The system eliminates the need for a costly and complex space stabilized gimballed sensor while offering improved performance over a system utilizing a pure body fixed sensor.

9 Claims, 11 Drawing Figures

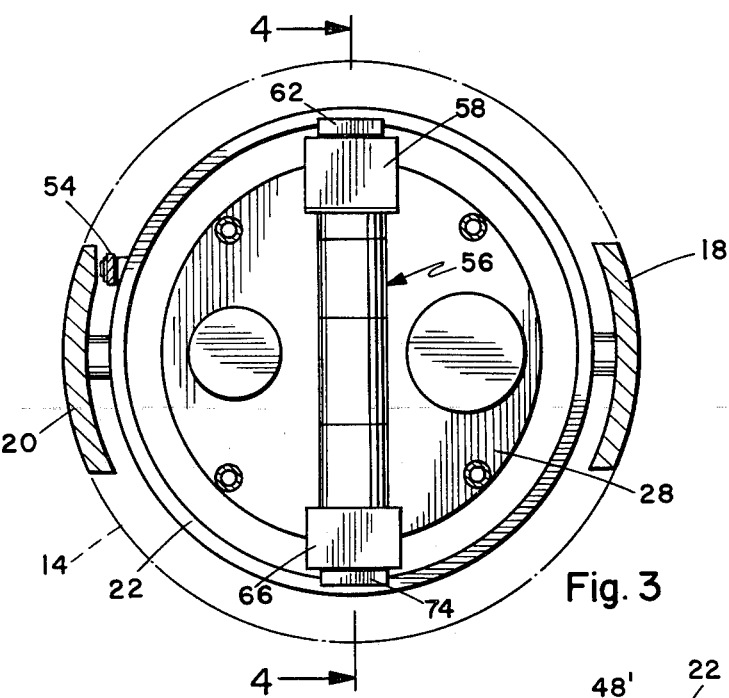
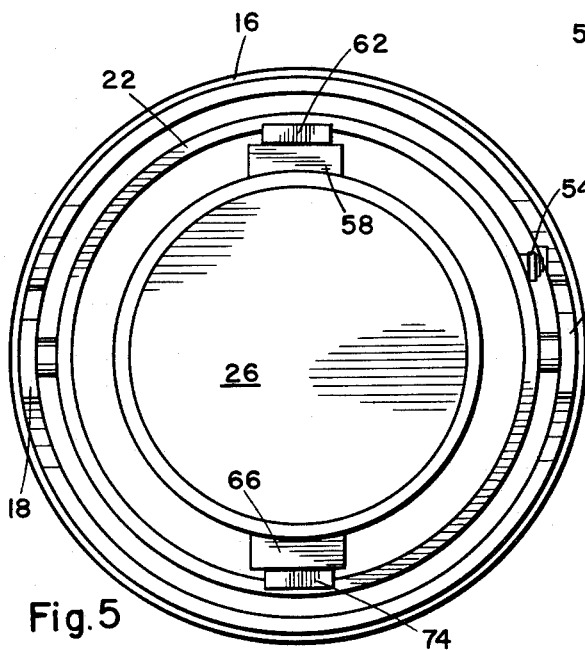
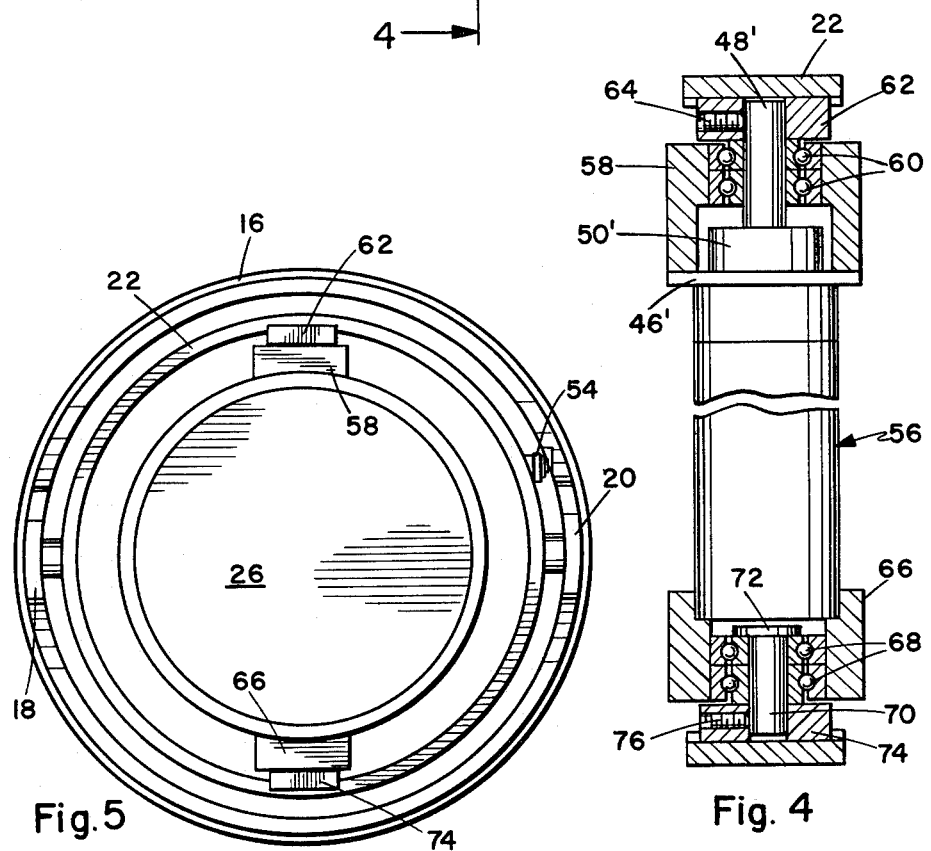
Fig. 3
Fig. 5
Fig. 4

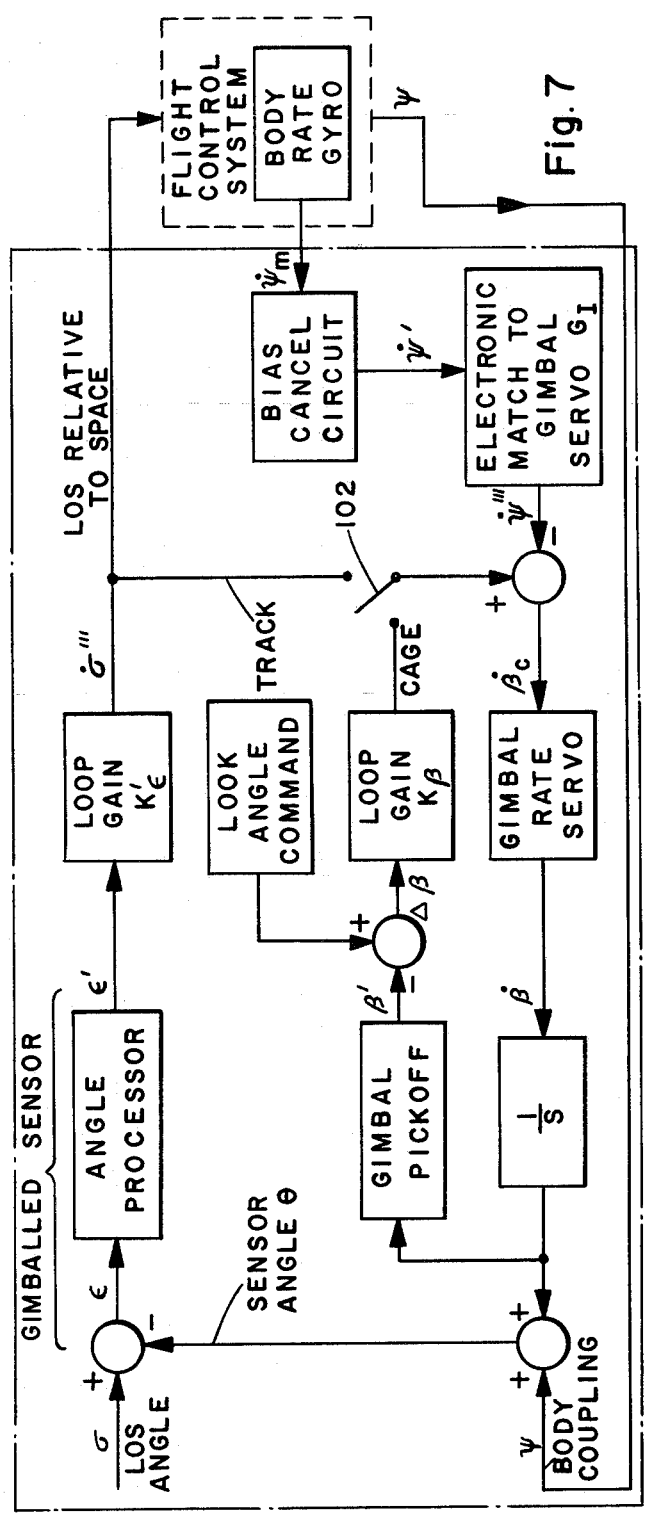
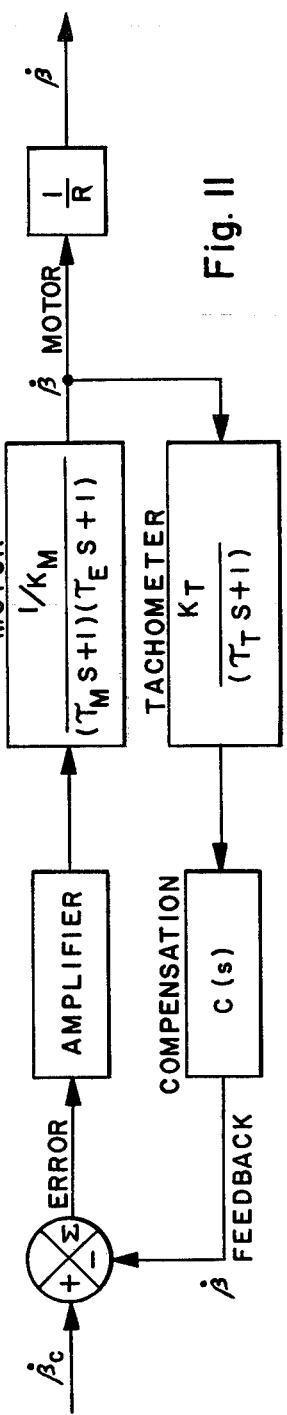
Fig. 7
Fig. 11

$\mathcal{L}_S$ = CENTER LINE OF SENSOR
$\mathcal{L}_A$ = CENTER LINE OF AIRFRAME
$\epsilon$ = ANGLE MEASURED BY SENSOR
$\beta$ = SENSOR/GIMBAL ANGLE RELATIVE TO AIRFRAME
$\psi$ = AIRFRAME ANGLE
$\sigma$ = LOS (LINE OF SIGHT) ANGLE
$\theta$ = SENSOR/GIMBAL ANGLE RELATIVE TO SPACE
$V$ = VELOCITY OF AIRFRAME
$\gamma$ = VELOCITY HEADING ANGLE
$\alpha$ = ANGLE OF ATTACK

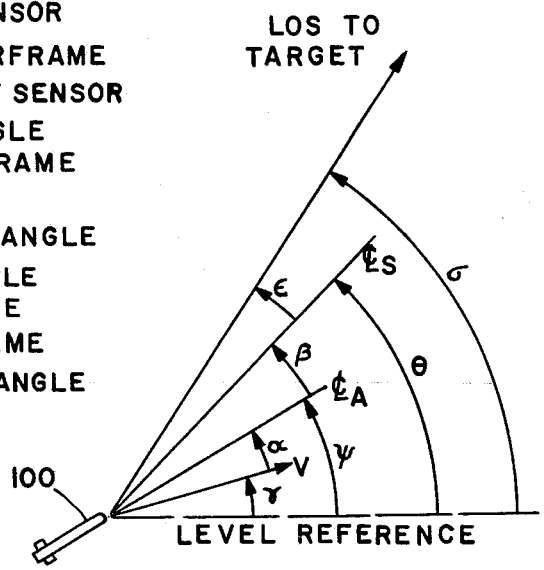

Fig. 8

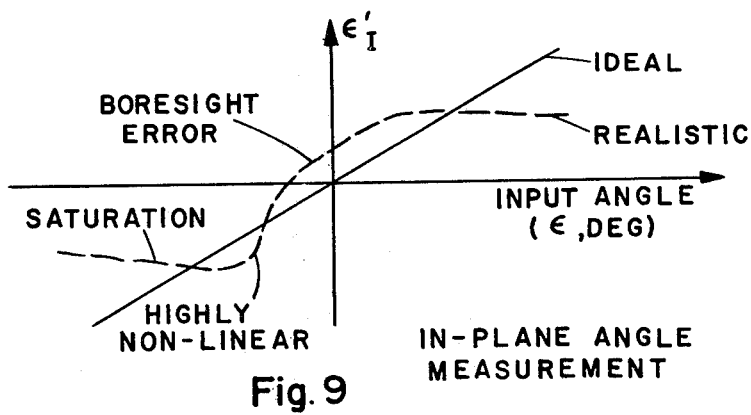

Fig. 9

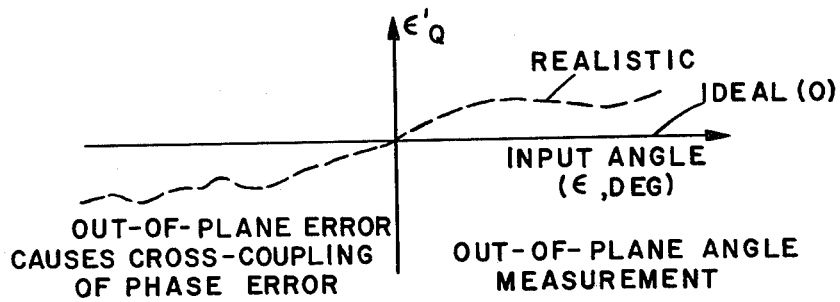

Fig. 10

BODY REFERENCED GIMBALLED SENSOR SYSTEM

BACKGROUND OF THE INVENTION

The present invention relates to sensing systems for airframes, and more particularly, to a body referenced gimballed sensor system which may be utilized in conjunction with the flight control system of an airframe to provide proportional navigation of the airframe to a target.

In the past, the sensor of a homing airframe, such as a radar, electro-optical sensor, or acoustical sensor, has been mounted on a space stabilized gimbal so that the angular motion of the airframe is removed from the sensing and flight control systems. This requires the utilization of expensive and complex space stabilization mechanisms. Such mechanisms include rate gyros or precessible free gyros.

A less expensive approach has been to mount the sensor directly to the airframe, without containing any inertia sensors/stabilization. This eliminates the expensive and complex stabilization mechanisms. However, this approach leads to poor performance. Since the sensor is not mounted on a gimbal, its look angle is limited. Furthermore, with this approach, it is difficult to overcome problems attributable to static gain, static phasing, non-linearity, etc. of the sensor.

SUMMARY OF THE INVENTION

It is therefore the primary object of the present invention to provide an inexpensive alternative sensor system which overcomes the drawbacks of the prior art approaches described above.

It is another object of the present invention to provide an improved sensor system that may be utilized to proportionally navigate an airframe to a target.

Accordingly, the present invention provides a system for proportionally navigating an airframe to a target wherein the airframe is maneuvered by an onboard flight control system including body rate gyros for detecting the movement of the airframe relative to a fixed reference. A target sensor is mounted for pivotal movement in the pitch and yaw planes on a gimbal assembly rigidly connected to the airframe body. Mechanisms, such as motor/tachometer/potentiometer assemblies, pivot the sensor in the pitch and yaw planes and provide signals representative of the angular position of the sensor. These signals, along with the sensor output, are utilized in a gimbal track loop for pivoting the sensor so that it tracks the target. The outputs of the body rate gyros are utilized to remove or decouple the airframe body motion from the gimbal track loop signal. The system eliminates the need for a costly and complex space stabilized gimballed sensor while offering improved performance over a system utilizing a pure body fixed sensor.

BRIEF DESCRIPTION OF THE DRAWINGS

FIG. 3 is a sectional view taken along line 3—3 showing the motor/tach/pot assembly for the yaw plane of the gimballed sensor.

FIG. 4 is an enlarged, fragmentary, part sectional and part elevational view of the motor/tach/pot assembly for the yaw plane taken generally along line 4—4 of FIG. 3.

FIG. 5 is a front end elevation view of the gimballed sensor of FIGS. 1 and 2.

FIG. 7 is a functional block diagram of a second embodiment of the body referenced gimballed sensor system of the present invention in which the body motion of the airframe is decoupled internally of the gimballed sensor track loop.

FIG. 8 is a legend of the symbols utilized in FIGS. 6, 7 and 9–11.

FIGS. 9 and 10 are graphs illustrating certain measurement errors inherent in the gimballed sensor which the systems of FIGS. 6 and 7 overcome.

FIG. 11 is a functional block diagram illustrating further details of the gimbal rate servo drive of the systems of FIGS. 6 and 7.

DESCRIPTION OF THE PREFERRED EMBODIMENTS

Figure 1:
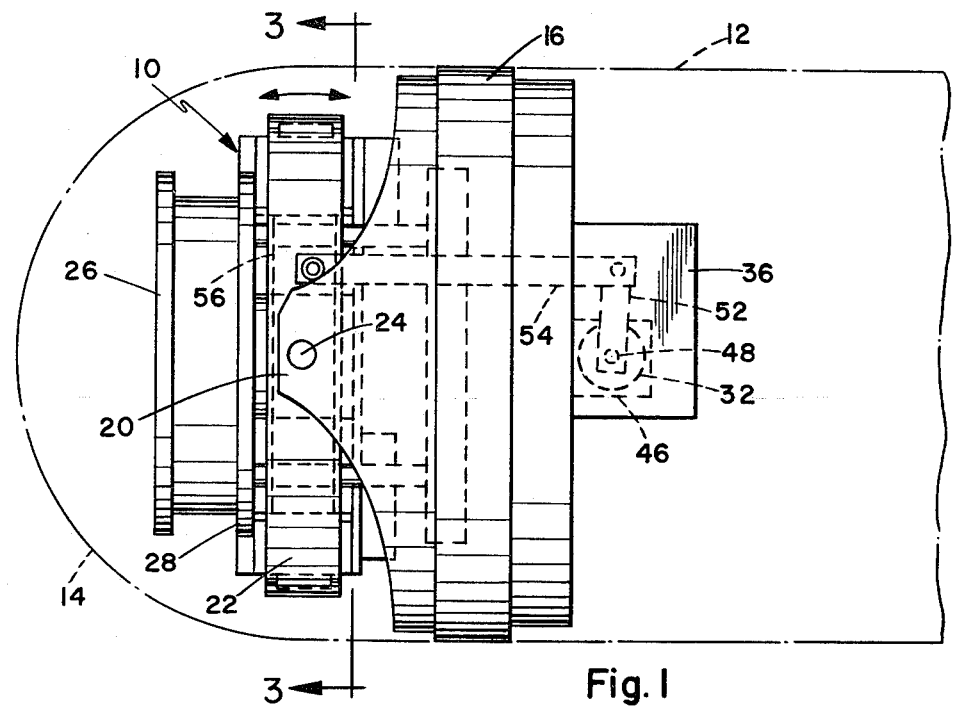
FIG. 1 is a side elevation view of a gimballed sensor rigidly mounted to the body of an airframe (shown in phantom lines) in accordance with the present invention.
Figure 2:
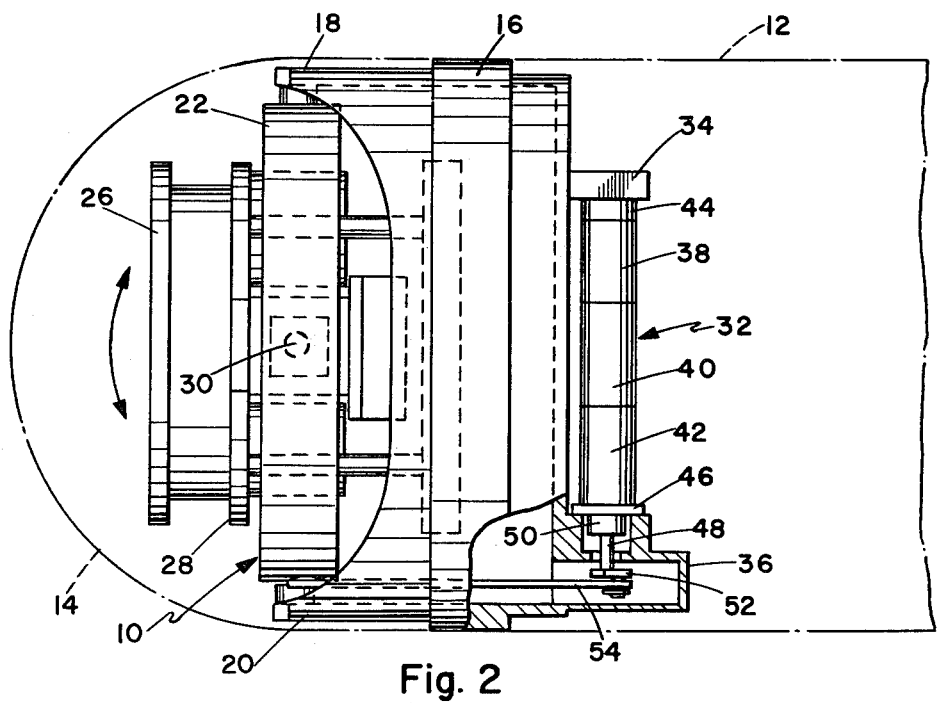
FIG. 2 is a side elevation view similar to that of FIG. 1 of the gimballed sensor rotated ninety degrees about the longitudinal axis of the airframe.

As illustrated in FIGS. 1 and 2, a gimballed sensor assembly generally designated 10 is mounted with the nose portion 12 (shown in phantom lines) of an airframe such as a missile or drone. The nose portion includes a hemispherical radome 14. The gimballed sensor assembly 10 includes an annular base member 16 rigidly secured to the nose portion 12 of the airframe. The base member 16 includes a pair of spaced apart, forwardly projecting trunion support members 18 and 20. A ring 22 is mounted between the support members 18 and 20 and is rotatably connected thereto for pivotal movement about an axis 24 extending perpendicularly with respect to the plane of the drawing in FIG. 1. The orientation of this axis 24 is selected so that the ring may be pivoted in the pitch plane of the airframe by mechanisms hereafter described.

A target sensor 26 (FIG. 5) is carried by an annular mounting assembly 28 which is mounted concentrically within the ring 22. The mounting assembly 28 is rotatably connected to the ring 22 for pivotal movement about an axis 30 (FIG. 2) which intersects the pivotal axis 24 (FIG. 1) of the ring 22 at a ninety degree angle. The axis 30 extends perpendicuarly with respect to the plane of the drawing in FIG. 2. The axis 30 is thus oriented with respect to the body of the airframe so that the mounting assembly 28 can be pivoted in the yaw plane of the airframe by mechanisms hereafter described.

The target sensor 26 (FIG. 5) carried by the assembly 28 may be a radar, an electro-optical sensor, an acoustical sensor, an infrared sensor or any other suitable target sensor adapted to receive signals from the target through the radome 14. Thus, the sensor 26 can be pivoted in both the pitch and yaw planes of the airframe for tracking or seeking a target. It is important to note, however, that the support structure on which the target sensor is gimballed is rigidly connected directly to the nose portion 12 of the airframe without containing any inertial rate sensors or stabilization. This is in contrast with the prior art approach of space stabilizing the gamballed sensor so that the angular motion of the airframe does not effect the tracking of the target by the sensor. The mounting of the sensor depicted in FIGS. 1-5 herein is also different from the prior art approach in which the sensor is not mounted on a gimbal at all, but instead is completely fixed to the body of the airframe. This last mentioned prior art approach is sometimes referred to as a "pure body fixed guidance sensor."

Means are provided for pivoting the sensor in both the pitch and yaw planes and for providing signals representative of the angular rate of motion of the sensor and the angular position of the sensor in both the pitch and yaw planes of the airframe. Referring again to FIGS. 1 and 2, a first motor/tach/pot assembly 32 is mounted at its opposite ends to a bracket 34 and a support housing 36 connected to the rear side of the base member 16. The assembly 32 includes a cylindrical tachometer 38, a cylindrical motor 40 and a cylindrical gear head 42 mounted in end to end relationship as shown in FIG. 2. A cylindrical spacer or end cap 44 is connected to the outer end of the tachometer 38. A support plate 46 is connected to the outer end of the gear head 42 and is also secured to the support housing 36. The output shaft 48 of the assembly 32 extends from the gear head 42, through the plate 46 and through a potentiometer 50 connected to the plate.

When the motor 40 of the motor/tach/pot assembly 32 (FIG. 2) is energized, it drives both the gear head 42 and the tachometer 38. The gear head 42 is a gear reduction assembly which drives the output shaft 48 at a substantially lower rpm and higher torque than the armature of the motor 40. The output shaft 40 turns the wiper element of the potentiometer 50 relative to its fixed element. The gear head is optional. A direct drive from the motor to the sensor will also work.

As best seen in FIG. 1, a crank arm 52 is rigidly mounted to the outer end of the output shaft 48 of the first motor/tach/pot assembly 32. A linkage arm 54 has one end pivotally connected to the outer end of the crank arm 52 and another end pivotally connected to the ring 22. As shown in FIG. 2, both the crank arm 52 and the linkage arm 54 are enclosed within the support housing 36. It will thus be understood that the motor 40 can be energized to pivot the sensor 26 in the pitch plane of the airframe. The output of the tachometer 38 will provide an indication of the angular rate of movement of the sensor in the pitch plane. The voltage across the potentiometer 50 can be measured to provide an indication of the angular position of the sensor in the pitch plane. The potentiometer voltage can be electrically differentiated to yield an indication of the angular rate of the sensor. The motor 40 thus functions as the servo motor for the gimballed sensor track loop.

Similarly, a second motor/tach/pot assembly 56 (FIG. 3) is mounted to the rear side of the sensor mounting assembly 28 for rotating the target sensor 26 about the yaw plane of the airframe. The second assembly 56 is mounted so that it coincides with the pivot axis 30 (FIG. 2) of the sensor mounting assembly 28. The second motor/tach/pot assembly 56 is identical to the first motor/tach/pot assembly 32 except that the former has a shorter output shaft length and a smaller cap on the outer end of the tachometer so that it will fit within the ring 22 as shown in FIGS. 3 and 4.

Referring to FIG. 4, the plate 46' of the second motor/tach/pot assembly 56 is secured to a first bearing housing 58. The potentiometer 50' of the assembly 56 is mounted within the housing 58 and the output shaft 48' is journaled in a pair of ball bearings 60 also mounted within the housing 58. A pivot or bushing 62 is secured to the outer end of the output shaft 48' with a set screw 64. The bushing 62 is in turn rigidly secured to the inner wall of the ring 22.

The other end of the second motor/tach/pot assembly 56 is rigidly secured to a second bearing housing 66 (FIG. 4). A pair of ball bearings 68 are mounted within the housing 66. A support pin 70 is journaled in the ball bearing 68. The pin 70 is retained in position by a head 72 integrally formed therewith at one end and by a pivot or bushing 74 rigidly secured to the other end of the pin by a set screw 76. The bushing 74 is in turn rigidly secured to the inner wall of the ring 22.

As shown in FIG. 3, the bushings 62 and 74 are secured to the inner wall of the ring 22 at locations opposite from one another so that the second motor/tach/pot assembly 56 extends diametrically across the ring, thereby permitting the sensor mounting assembly 28 to pivot about the axis 30 (FIG. 2). Thus, it will be understood that the motor of the second motor/tach/pot assembly 56 can be energized to pivot the sensor 26 in the yaw plane of the airframe. The tachometer of the assembly 56 will provide an indication of the angular rate of motion of the sensor in the yaw plane. The voltage across the potentiometer 50' of the assembly 56 can be measured to provide an indication of the angular position of the sensor in the yaw plane. Alternatively, the potentiometer voltage can be differentiated to yield an indication of the angular rate of motion of the sensor relative to the airframe.

Figure 6:
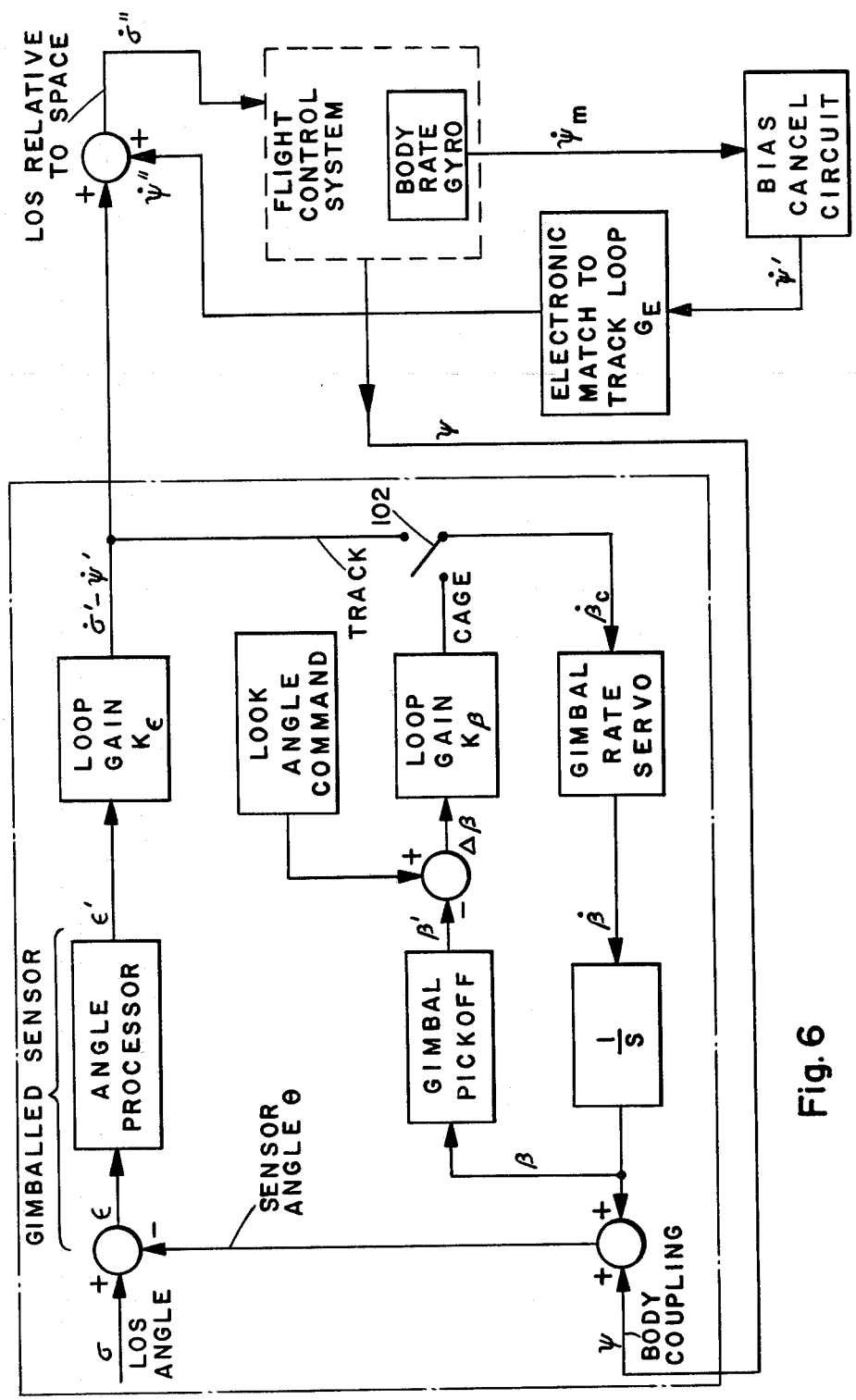
FIG. 6 is a functional block diagram of a first embodiment of the body referenced gimballed sensor system of the present invention in which the body motion of the airframe is decoupled externally of the gimballed sensor track loop.

FIG. 6 is a functional block diagram illustrating a first embodiment of the body referenced gimballed sensor system of the present invention in which the body motion of the airframe is decoupled externally of the gimballed sensor track loop. It illustrates the manner in which the body referenced gimballed sensor of FIGS. 1-5 may be utilized in conjunction with the automatic flight control system of an airframe to provide proportional navigation of the flying airframe to a moving target detected by the sensor. As used herein, the term "proportional navigation" refers to a guidance system in which commands are generated to drive the angular line of sight rate between the airframe and the target toward zero. The legend of FIG. 8 defines the symbol and sign conventions utilized in FIGS. 6, 7 and 9-11, as well as in the narrative description set forth hereafter. In FIG. 8, the airframe is depicted in the form of a missile 100.

FIG. 6 illustrates the operation of the first embodiment of the body referenced gimballed sensor system in regard to one plane, either the pitch or yaw plane. It will be understood that the system of the present invention operates simultaneously in the same fashion with regard to both the pitch and yaw planes. In both FIGS. 6 and 7, the use of a dot (.) above a given parameter represents the rate of change of that parameter. For example, sigma dot ($\dot{\sigma}$) refers to the rate of change of the line of sight (LOS) from the missile to the target. Utilization of a prime (') next to a given parameter indicates a system equivalent, such as a measured signal, of a real world parameter. For example, epsilon prime ($\epsilon'$) indicates the voltage signal measured out of the angle processor. This is the tracking error angle measured by the sensor in the pitch or yaw plane. The utilization of a double prime notation (″) after a parameter indicates that it is a system equivalent of a real world parameter after it has been measured or generated and then passed through an additional processing stage such as a filter. Thus, for example, the symbol psi dot double prime ($\ddot{\psi}''$) refers to a system equivalent of the airframe angle rate after it has been generated from the body rate gyro of the flight control system and processed first through the bias cancel circuit and then the electronic match to the track loop ($G_E$). Additional prime notations refer to additional processing stages.

The system of FIG. 6 can operate in two modes, namely a cage mode and a track mode. In the cage mode, command signals which may originate with onboard guidance circuitry drive the gimballed sensor through predetermined angular patterns to determine the location of a target. Once the target has been located, commands from the onboard guidance circuitry switch the body referenced gimballed sensor system into a track mode. In this mode, the motors of the assemblies 32 and 56 are driven so that the gimballed sensor tracks the target. The flight control system of the airframe utilizes information from the body referenced gimballed sensor system to maneuver the airframe in such a manner as to drive the angular line of sight rate to the target to zero. The switching between the cage and track modes is illustrated diagrammatically in FIG. 6 by a switch 102.

The operation of the body referenced gimballed sensor system in its cage mode will be described initially. Again, FIG. 6 illustrates the operation of the system in one of the control planes, either the pitch or yaw plane. The sensor angle beta ($\beta$) relative to the airframe is detected by a gimbal pickoff, which in the embodiment disclosed comprises the potentiometer of one of the motor/tach/pot assemblies 32 and 56. This potentiometer provides an output signal beta prime ($\beta'$) which is compared with a look angle command signal from the onboard guidance circuitry to produce the caging error angle signal delta beta ($\Delta\beta$). This signal is converted through a loop gain $K_{beta}$ into a beta dot command ($\dot{\beta}_c$) signal for driving the gimbal rate servo circuitry. This latter circuitry drives the motor of one of the assemblies 32 and 56 to cause the sensor 26 to tilt at a predetermined angular rate beta dot ($\dot{\beta}$). During the time frame of this command, the sensor is thus pivoted on its gimbal assembly to the desired look angle. In FIG. 6, the LaPlace transform notation 1/S indicates that the angular rate of movement beta dot ($\dot{\beta}$) of the sensor is integrated with respect to time to produce the new angular position of the sensor relative to the airframe.

The operation of the first embodiment of the body referenced gimballed sensor system (FIG. 6) in its track mode is as follows. The airframe angle psi ($\psi$) due to the coupling of the gimballed sensor directly to the airframe body, the sensor angle beta ($\beta$) relative to the airframe, the sensor angle theta ($\theta$) relative to space, and the line of sight (LOS) angle signma ($\sigma$) combine in the missile geometry to produce an angle epsilon ($\epsilon$) which is measured by the gimballed sensor angle processor as epsilon prime ($\epsilon'$). The epsilon prime signal ($\epsilon'$) frequently has undesirable characteristics attributable to factors such as boresight error, gain error, phase error, saturation, etc. This is illustrated graphically in FIGS. 9 and 10. An important feature of the present invention is that the undesirable effects of these measurement errors can be overcome through the feedback and decoupling features hereafter described. The angle measurement epsilon prime (E′) is converted through a loop gain $K_{epsilon}$ ($\kappa_\epsilon$) into a signal sigma dot prime minus psi dot prime ($\dot{\sigma}' - \dot{\psi}'$).

The signal sigma dot prime minus psi dot prime ($\dot{\sigma}' - \dot{\psi}'$) becomes the beta dot command signal ($\dot{\beta}_c$) which is transmitted to the gimbal rate servo circuitry, the switch 102 being in its track mode position at this time. The gimbal rate servo circuitry is shown in greater detail in FIG. 11, wherein the transfer functions are given in LaPlace transform notations. The gimbal rate servo circuitry employs only tachometer feedback to achieve its rate mode. The tachometer indicated in FIG. 11 is the tachometer of one of the motor/tach/pot assemblies 32 and 56.

The gimbal rate servo circuitry depicted in FIG. 11 produces an angular rate output beta dot ($\dot{\beta}$) which, integrated over time as represented by the LaPlace transform function 1/S, results in movement of the sensor in the plane under examination (either pitch or yaw) to an angle beta ($\beta$) relative to the airframe.

The airframe is maneuvered in the air by an onboard flight control system, examples of which are well known in this art. The flight control system includes body rate gyros, signals from which are utilized in removing airframe body motions from the gimbal tracking loop signal. Specifically, in order for the flight control system to proportionally navigate the airframe toward the target, it must have available to it signals representative of the line of sight (LOS) rate from the airframe to the target, measured, for example, with respect to a level reference. In FIG. 8, this line of sight rate information is represented by sigma dot ($\dot{\sigma}$). The gimbal which pivotally mounts the sensor for motion in the pitch and yaw planes of the airframe is directly mounted to the body of the airframe, without containing any inertia sensors/stabilization. Therefore, body motion must be removed from the signal provided by the gimbal track loop before it can be utilized by the flight control system in driving the line of sight rate from the airframe to the target toward zero. Specifically, in the first embodiment of the body referenced gimballed sensor system illustrated in FIG. 6, the output of the body rate gyro of the flight control system is fed to a bias cancel circuit. This latter circuit provides an output psi dot prime ($\dot{\psi}'$) representative of the angular rate of change of the airframe central axis relative to a reference, which in FIG. 8 is a level reference. The signal psi dot prime is fed to an electronic match circuit $G_E$, such as a filter, which is specifically matched to the gimbal track loop. This match circuit $G_E$ has an appropriate transfer function such that its output psi dot double prime ($\ddot{\psi}''$) can be combined with the output of the track loop sigma dot prime minus psi dot prime ($\dot{\sigma}' - \dot{\psi}'$) to produce a signal sigma dot double prime ($\dot{\sigma}''$). This signal sigma dot double prime represents the line of sight rate of the airframe relative to space and is utilized by the onboard flight control system so that the airframe can be approximately maneuvered to proportionally navigate the airframe to the target.

FIG. 7 is a functional block diagram illustrating a second embodiment of the body referenced gimballed sensor system of the present invention in which the body motion of the airframe is decoupled internally of the gimballed sensor track loop. It illustrates the manner in which the body referenced gimballed sensor of FIGS. 1–5 may be utilized in conjunction with the automatic flight control system of an airframe to provide proportional navigation of the flying airframe to a target detected by the sensor. Again, FIG. 7 illustrates the operation of the second embodiment of the body referenced gimballed sensor system in regard to one plane, either the pitch or yaw plane. This second embodiment operates simultaneously in the same fashion with regard to both the pitch and yaw planes. The second embodiment, like the first embodiment, operates in both a cage and a track mode. The first and second embodiments operate similarly in their cage modes.

The operation of the second embodiment illustrated in FIG. 7 in its track mode is as follows. The airframe angle psi ($\psi$) due to the coupling of the gimballed sensor directly to the airframe body, the sensor angle beta ($\beta$) relative to the airframe, the sensor angle theta ($\theta$) relative to space, and the line of sight angle sigma ($\sigma$) combine in the missile geometry to produce an angle epsilon ($\epsilon$), which is measured by the gimballed sensor angle processor as epsilon prime ($\epsilon'$). This angle measurement epsilon prime is converted through a loop gain $K'_{epsilon}$ into a signal sigma dot triple prime ($\dot{\sigma}'''$). This signal is different from the output of the loop gain $K_{epsilon}$ ($\kappa\epsilon$) of the first embodiment of FIG. 6 since the two are taken at different points in the track loop circuitry. In FIG. 7, the signal sigma dot triple prime ($\dot{\sigma}'''$) represents the angular rate of change of the line of sight of the missile relative to space. This signal is supplied to the onboard automatic flight control system of the airframe which makes corrective maneuvers so as to drive the line of sight between missile and target toward zero.

Continuing with FIG. 7, the output of the body rate gyro of the flight control system is fed to a bias cancel circuit which produces an output signal psi dot prime ($\dot{\psi}'$) representative of the rate of change of the angle of the central axis of the airframe relative to a reference, such as a level reference as shown in FIG. 8. The signal psi dot prime ($\dot{\psi}'$) is fed to an electronic gimbal servo circuit $G_I$ which is matched to the gimbal track loop. The circuit $G_I$ has a transfer function such that its output psi dot triple prime ($\dot{\psi}'''$), when subtracted from the signal sigma dot triple prime ($\dot{\sigma}'''$) fed via the switch 102 produces a beta dot command signal ($\dot{\beta}_c$) for driving the gimbal rate servo. The internal approach to decoupling the body motion which is illustrated in FIG. 7 is generally preferred to the external approach illustrated in FIG. 6 since the former is less sensitive to sensor measurement errors.

Having described preferred embodiments of the body referenced gimballed sensor system, it will be apparent to those skilled in this art that our invention may be modified in both arrangement and detail. Therefore, the protection afforded our invention should be limited only in accordance with the scope of the following claims.

We claim:

1. A system for proportionally navigating an airframe to a target wherein the airframe is maneuvered by an onboard flight control system, including body rate gyros for detecting the movement of the airframe relative to a fixed reference, comprising:
    a sensor for detecting the target;
    gimbal means rigidly connected to the airframe for carrying the sensor for pivotal movement in the pitch and yaw planes of the airframe;
    drive means for pivoting the sensor in the pitch and yaw planes;
    means for providing signals representative of the angular rate of motion of the sensor in the pitch and yaw planes;
    gimbal track loop means responsive to the output of the sensor and to the signal providing means for generating a track loop signal and controlling the drive means to cause the sensor to track the target; and
    decoupling means for removing the movement of the airframe from the track loop signal utilizing the output of the body rate gyros.

2. A system according to claim 1 wherein the decoupling means removes the movement of the airframe from the track loop signal external to the gimbal track loop means.

3. A system according to claim 1 wherein the decoupling means removes the movement of the airframe from the track loop signal internal to the track loop means.

4. A system according to claim 1 wherein the signal providing means includes:
    a tachometer; and
    means for drivingly connecting the tachometer with the drive means.

5. A system according to claim 1 wherein the signal providing means includes:
    a potentiometer; and
    means for drivingly connecting the potentiometer with the drive means.

6. A system according to claim 1 and further comprising cage loop means for pivoting the sensor according to look angle command signals received from an onboard guidance circuit.

7. A system according to claim 1 wherein the decoupling means includes a bias cancel circuit.

8. A system according to claim 6 wherein the cage loop means includes means for providing signals representative of the angular position of the sensor in the pitch and yaw planes.

9. A method of proportionally navigating an airframe to a target wherein the airframe is maneuvered by an onboard flight control system based upon signals received from a target sensor, the flight control system including body rate gyros for detecting the movement of the airframe relative to a fixed reference, comprising:
    mounting the sensor for pivotal movement in the pitch and yaw planes of the airframe on a gimbal assembly rigidly connected to the airframe;
    generating a track signal representative of the angular rate of motion and the angular position of the sensor in the pitch and yaw planes;
    pivoting the sensor in the pitch and yaw planes to track the target utilizing the track signal and the output of the sensor; and
    removing the motion of the airframe from the track signal utilizing the output of the body rate gyros.

* * * * *